(12) United States Patent
Hawkinson et al.

(10) Patent No.: US 11,831,488 B2
(45) Date of Patent: Nov. 28, 2023

(54) SYSTEMS AND METHODS FOR SELF-CORRECTING NETWORK EQUIPMENT

(71) Applicant: CenturyLink Intellectual Property LLC, Broomfield, CO (US)

(72) Inventors: Shaun Hawkinson, St. Paul, MN (US); Kevin Lu, Bridgewater, NJ (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/820,928

(22) Filed: Aug. 19, 2022

(65) Prior Publication Data

US 2023/0099424 A1    Mar. 30, 2023

Related U.S. Application Data

(60) Provisional application No. 63/366,267, filed on Jun. 13, 2022, provisional application No. 63/249,544, filed on Sep. 28, 2021.

(51) Int. Cl.
| | |
|---|---|
| *H04L 41/0631* | (2022.01) |
| *H04L 41/0604* | (2022.01) |
| *H04L 41/069* | (2022.01) |

(52) U.S. Cl.
CPC ........ *H04L 41/0631* (2013.01); *H04L 41/069* (2013.01); *H04L 41/0627* (2013.01)

(58) Field of Classification Search
CPC ...................... H04L 41/0631; H04L 41/0627; H04L 41/069

USPC .......................................................... 709/224
See application file for complete search history.

(56) References Cited

U.S. PATENT DOCUMENTS

| | | | |
|---|---|---|---|
| 9,860,109 B2* | 1/2018 | Koverman | .......... H04L 41/0631 |
| 10,469,307 B2* | 11/2019 | Nucci | ................... H04L 41/069 |
| 10,805,671 B2* | 10/2020 | Rahman | ........... H04N 21/44231 |
| 11,212,161 B2* | 12/2021 | Giura | .................. H04L 41/0627 |
| 11,336,507 B2* | 5/2022 | Acharjee | ................ G06N 3/045 |
| 11,349,703 B2* | 5/2022 | Mercian | ............. H04L 41/0654 |
| 11,394,604 B2* | 7/2022 | Rayes | ................. H04L 41/0813 |
| 11,424,977 B2* | 8/2022 | Ravichandran | ......... H04L 41/40 |

(Continued)

FOREIGN PATENT DOCUMENTS

| | | | | |
|---|---|---|---|---|
| CN | 111726239 A | * | 9/2020 | |
| EP | 4117236 A1 | * | 1/2023 | |
| JP | 2021141582 A | * | 9/2021 | ........... G06K 9/6256 |

*Primary Examiner* — Melvin H Pollack

(57) ABSTRACT

A system and method for mitigating anomalies in a network device. One or a combination of mitigation actions may be pre-programmed into a plurality of customer premises equipment (CPE) devices. The mitigation actions may be available as temporary or permanent work arounds as problems are detected that match known or discovered patterns of log events. Unsupervised machine learning techniques may be used to identify and correlate new patterns of log events with device anomalies or malfunctions. When a new pattern of log events is discovered and correlated to an anomaly or malfunction in a group of CPE devices, the discovered pattern may be written to the group of CPE devices with instructions to use particular ones of the mitigation actions. The CPE devices can then, in examples, monitor their own logs to detect the patterns and implement one or more of the mitigation actions.

20 Claims, 10 Drawing Sheets

(56) References Cited

U.S. PATENT DOCUMENTS

| | | | |
|---|---|---|---|
| 11,431,557 B1* | 8/2022 | Shrestha | H04L 41/0686 |
| 11,494,255 B2* | 11/2022 | Wang | G06F 11/0709 |
| 11,496,353 B2* | 11/2022 | Chandrasekhar | H04L 41/142 |
| 11,620,528 B2* | 4/2023 | Ryan | G06N 3/045 |
| | | | 709/224 |
| 11,637,742 B2* | 4/2023 | Côté | H04L 41/40 |
| | | | 370/216 |
| 11,637,744 B2* | 4/2023 | Moulik | G06N 5/022 |
| | | | 709/224 |
| 11,640,348 B2* | 5/2023 | Bugdayci | G06F 11/301 |
| | | | 709/224 |
| 11,671,308 B2* | 6/2023 | Ali-Tolppa | H04L 41/5009 |
| | | | 709/224 |
| 11,671,312 B2* | 6/2023 | Puri | H04L 43/04 |
| | | | 709/224 |
| 2022/0014419 A1* | 1/2022 | Tee | H04L 41/0893 |
| 2022/0094606 A1* | 3/2022 | Casey | H04L 43/04 |
| 2022/0182278 A1* | 6/2022 | Vangapalli | H04L 67/30 |
| 2023/0090169 A1* | 3/2023 | Mitcsenkov | H04L 65/1083 |
| | | | 455/423 |
| 2023/0093130 A1* | 3/2023 | Fenoglio | H04L 41/147 |
| | | | 709/224 |
| 2023/0099424 A1* | 3/2023 | Hawkinson | H04L 41/0893 |
| | | | 709/224 |

* cited by examiner

SYSTEMS AND METHODS FOR SELF-CORRECTING NETWORK EQUIPMENT

CROSS-REFERENCE TO RELATED APPLICATIONS

This application claims the benefit of U.S. Provisional Application No. 63/249,544 filed Sep. 28, 2021, and U.S. Provisional Application No. 63/366,267, filed Jun. 13, 2022, entitled "Systems and Methods for Self-Correcting Network Equipment," and which applications are incorporated herein by reference in their entireties.

BACKGROUND

Various types of customer premises equipment (CPE) devices, such as network gateway devices, may operate to log events associated with its own software, firmware, and/or hardware. One or a combination of such log events may be correlated to anomalies/malfunctions that occur with the CPE devices. For example, some log events may correspond to the CPE devices not functioning as expected and in a way that may result in customer complaints and/or a technician visit to address the CPE device anomalies/malfunctions. It is with respect to this general technical environment that aspects of the present technology disclosed herein have been contemplated. Furthermore, although a general environment is discussed, it should be understood that the examples described herein should not be limited to the general environment identified herein.

SUMMARY

Examples described herein generally relate to a system and method for mitigating anomalies in a network device. Logs of events collected by customer premises equipment devices may be evaluated for identifying patterns of log events that may be related to device problems or failures. Mitigation processes may be determined for such patterns of events and implemented by the customer premises equipment devices themselves. Accordingly, among other things, aspects of the present disclosure include a method for mitigating anomalies in a network device comprising: receiving log event information for a plurality of network devices; determining a first pattern of log event information correlated to an anomaly of at least a first network device; selecting a first mitigation process including one or more mitigation actions; and instructing the first network device to monitor its own log event information for the first pattern of log event information and, when the first pattern of log event information is detected, to implement the first mitigation process.

Aspects of the present disclosure further include a method for mitigating anomalies in a network device, comprising storing a plurality of mitigation actions at the network device; logging events associated with software, firmware, or hardware of the network device; receiving a first pattern of log event information correlated to an anomaly and a first mitigation process to implement when the first pattern of log event information is detected; monitoring, at the network device, logged events for the first pattern of log event information; and when the first pattern of log event information is detected, implementing the first mitigation process at the network device, wherein the first mitigation process includes one or more of the mitigation actions.

Aspects of the present disclosure further include a system for mitigating anomalies in a network device, comprising: at least one processor; and memory storing instructions that, when executed by the at least one processor, cause the system to: receive log event information for a plurality of network devices; determine a first pattern of log event information correlated to an anomaly of at least a first network device; select a first mitigation process including one or more mitigation actions; and instruct the first network device to monitor its own log event information for the first pattern of log event information and, when the first pattern of log event information is detected, to implement the first mitigation process.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a system and method that can be used for mitigating anomalies in a network device in accordance with an embodiment. One or a combination of mitigation actions may be pre-programmed into a plurality of customer premises equipment (CPE) devices. The mitigation actions may be available as temporary or permanent work arounds as problems are detected that match known or discovered patterns of log events. For instance, machine learning techniques may be used to identify and correlate new patterns of log events with device anomalies or malfunctions. For instance, if a new pattern of log events is discovered that is correlated to an anomaly or malfunction in at least a group of CPE devices, the discovered pattern may be provided to the group of CPE devices (e.g., in a software or firmware update) along with instructions to use particular one(s) of the mitigation actions when the discovered pattern is detected by the CPE devices. The CPE devices can then, in examples, monitor their own logs to detect the patterns and implement one or more of the mitigation actions. These and other aspects are explained in more detail below with respect to FIGS. 1-6. Although examples of the present disclosure are described with respect to residential gateway CPE devices (e.g., a modems), the systems and methods described herein can also apply to other network devices.

Figure 1:
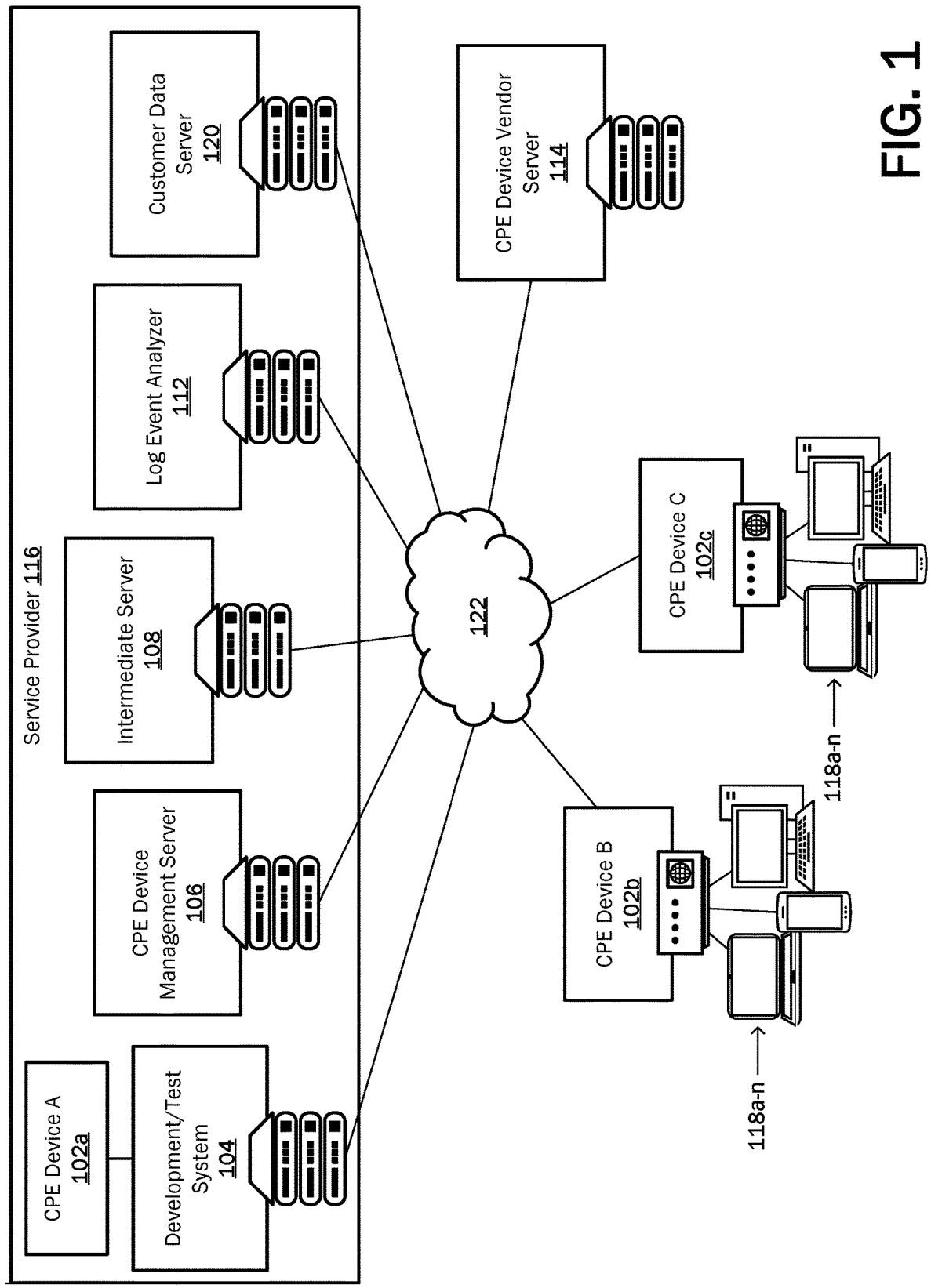
FIG. 1 illustrates an example for mitigating anomalies in a network device in accordance with an embodiment.

With reference now to FIG. 1, an example system 100 for mitigating anomalies in a network device is illustrated according to an example. As shown, the example system 100 may include a service provider system (referred to herein generally as service provider 116) in communication with a plurality of CPE devices 102a-c provided by or otherwise associated with the service provider 116. In an example implementation, the service provider 116 may be a network service provider that may provide a customer premises with access to a broadband network 122 (herein referred to generally as network 122). For example, the service provider 116 may be a provider of telecommunication services, data services, messaging services, etc., and the network 122 may include any one or more networks known in the art (e.g., wide area networks (WANs), local area networks (LANs), personal area networks (PANs), and/or the Internet). In an example, the service provider 116 may provide fiber-optic cable, copper cable, and/or other physical links/circuits that enable customers to access the network 122 via the CPE devices 102b-c.

According to an example implementation, the service provider 116 may include or be in communication with a development/test system 104, a CPE device management system 106, an intermediate server 108, a log event analyzer 112, and a customer data server 120 that may operate on various computing resources that may be distributed through one or a combination of networks 122. The plurality of CPE devices 102a-c may include a first group of devices (depicted in FIG. 1 as CPE device A 102a). For example, CPE device A 102a may represent a group of devices that may operate in or be tested in a test/lab setting. The plurality of CPE devices 102a-c may further include a second and third group of devices (depicted in FIG. 1 as CPE device B 102b and CPE device C 102c, respectively). CPE device B 102b and CPE device C 102c may include devices that may be implemented in the field (e.g., at a plurality of premises of customers of the service provider 116). For example, CPE device B 102b may represent a group of devices having at least one common characteristic (e.g., device model type, location, type of use) and CPE device C 102c may represent another group of devices having at least one common characteristic. The plurality of CPE devices 102a-c may generally be referred to herein as CPE devices 102.

In some example implementations, the CPE device 102 may operate as a residential gateway device, such as a modem that connects a router and/or one or more computing devices 118a-n (generally, 118) at a customer premises to the network 122. In some implementations, the CPE device 102 may further operate as a router. The various computing devices 118, for example, may include mobile devices, laptop computers, desktop computers, servers, gaming devices, set-top boxes, Internet-of-Things (IOT) devices, smart devices, etc. The CPE device 102 may operate to connect the computing devices 118 to the network 122 via one or a combination of communication transports provided by the service provider 116. In other example implementations, the CPE device 102 may operate as another type of device communicatively connected to the service provider 116 as part of receiving services in association with the service provider 116 via the network 122.

Figure 2:
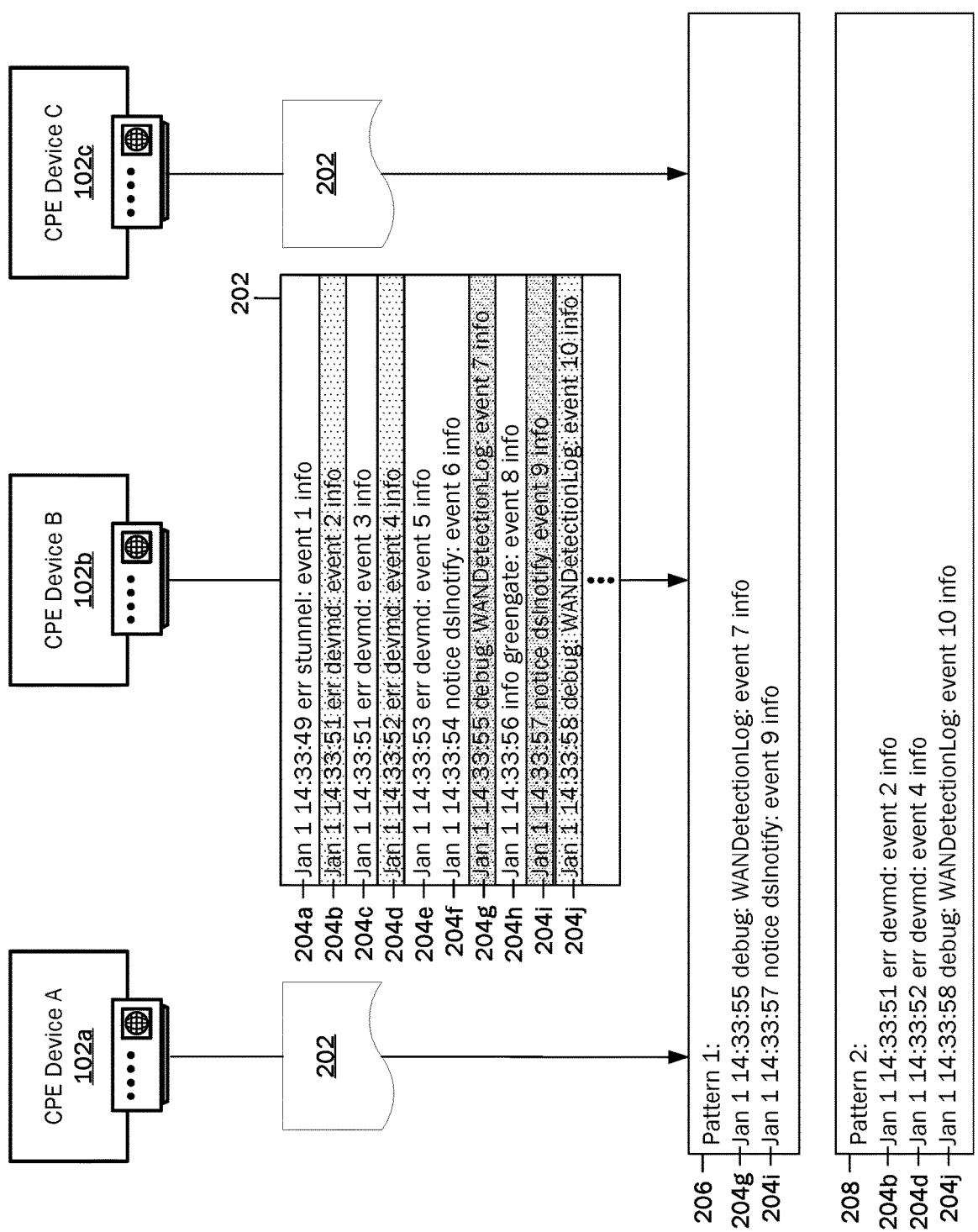
FIG. 2 illustrates example patterns of log event information that may be correlated to network equipment anomalies/malfunctions.

The CPE device 102 may include at least one processor and memory storing instructions that, when executed by the at least one processor, cause the CPE device 102 to perform one or more of the aspects of the present disclosure described herein. In some examples, the CPE device 102 may operate to log information about events associated with its software, firmware, and/or hardware. This information is herein referred to as log event information and may include various types of log events 204a-n (generally, log events 204) (e.g., critical, major, warning, debug, notice, info, error). For example, and as shown in FIG. 2, CPE device A 102a may operate to generate logs 202a comprising log event information associated with operation of CPE device A 102a in a test or lab environment. Additionally, CPE devices B 102b and C 102c may operate to generate logs 202b, 202c comprising log event information associated with operation of CPE devices B 102b and C 102c in a field or "real-world" environment.

In some examples, evaluation of log event information may reveal a pattern of one or a combination of log events 204 that correlate to the CPE device 102 working in a way other than expected or desired, which is herein referred to as an anomaly/malfunction. For example, non-exclusive patterns 206, 208 of log events 204 are depicted in FIG. 2. In examples, the identified patterns 206, 208 may preface an anomaly/malfunction within a period of time thereafter and/or may be indicative of an anomaly/malfunction that is occurring or has already occurred. Some example log events 204 that may be correlated to an anomaly/malfunction may include a MAC fatal error, a write failed to error, a reboot or reset, a kernel panic, a hang up, a lost or failed connection, a timeout, a terminated connection, etc. In some examples, an anomaly/malfunction may be determined by examining log event information received from a plurality of devices. In some examples, an anomaly/malfunction may be correlated to customer complaints, service calls, or other available information. For instance, in the field, some anomalies/malfunctions may result in a customer complaint and/or a service call to address the CPE device anomaly/malfunction, and a pattern of log event information may be correlated to a number of customer complaints, service calls, or other available information. In some examples, and with reference again to FIG. 1, information about customer complaints and service calls, as well as location and other information, may be stored in the customer data server 120. The customer data server 120 may be comprised of one or a plurality of data stores that may operate to store various information that may be correlated to an anomaly/malfunction and/or to a pattern 206, 208 of log events 204 for determining an anomaly/malfunction.

In some examples, log event information may be examined by the development/test system 104. For example, during development or testing of new hardware, firmware, or software of a CPE device 102, the development/test system 104 may be configured to identify anomalies/malfunctions associated with the operation of tested CPE devices (e.g., CPE device A 102a) and to correlate those to patterns 206, 208 of log event information (e.g., log events 204 in logs 202 received from the test CPE devices 102a). Some patterns (such as example patterns 206, 208) may be correlated to issues that may be considered as critical or major anomalies/malfunctions or otherwise applicable to a production environment (e.g., in the field). In an example, such anomalies/malfunctions may be identified and mitigated prior to implementing the new hardware, firmware, or software into CPE devices 102 in the field or production.

In another example, an anomaly/malfunction may be identified and correlated to a pattern 206, 208 during testing/development, but the anomaly/malfunction may be considered negligible or not applicable in the field at the time of testing/development. For instance, occurrence of the anomaly/malfunction and/or pattern 206, 208 in log event information may be evaluated against a threshold for determining a degree to which the rate of occurrence, severity, or other metric associated with the anomaly/malfunction and/or pattern 206, 208 may deviate from what has been typically observed or is expected to be observed about test CPE devices (e.g., CPE device A 102a) in the lab environment. In some examples, when an anomaly/malfunction and/or pattern 206, 208 is identified but is observed at a degree that does not meet an occurrence, severity, or another type of threshold (e.g., the issue may be considered negligible or not applicable to a production environment), the new hardware, firmware, or software under test may be deployed in the field and a record of the anomaly/malfunction and/or pattern 206, 208 in log event information identified during development or testing may be provided to the log event analyzer 112. The log event analyzer 112, for example, may be illustrative of a cloud-based "big data server" that may be implemented in, or in communication with, the network 122. In examples, the log event analyzer 112 may comprise multiple servers in a cloud-based, distributed computing service or system. The log event analyzer 112, for example, may be operative or configured to match identified patterns 206, 208 with log events 204 received from CPE devices 102 (e.g., test CPE devices (CPE device A 102a) and deployed CPE devices (CPE device B 102b and CPE device C 102c)) and to self-learn new patterns 206, 208. Thus, if the issue is seen in the field/production (e.g., at a degree that meet or exceeds the occurrence, severity, or another type of threshold), a mitigation process may be determined such that the issue can be effectively mitigated by the CPE device 102.

A mitigation process may include one or a combination of mitigation actions that can be performed by the CPE device 102 as a temporary or permanent work around for CPE device anomalies/malfunctions that may be known or that may be discovered in relation to a pattern 206, 208 of log event information. In some examples, a mitigation process may be determined by root cause analysis and troubleshooting CPE devices 102. Mitigation actions may vary and, in some examples, be preprogrammed into the firmware or software of the CPE device 102. For example, some mitigation actions may comprise automatic software, firmware, or hardware adjustments that can be performed by the CPE device 102, such as turning off a certain hardware element for a prescribed period of time, ceasing certain software processes, rebooting, etc. Other mitigation actions may comprise contacting the customer via a user interface for administration of the CPE device 102, email, messaging, phone, etc., to instruct the customer to perform some action or set of actions.

As mentioned above, in some examples, the log event analyzer 112 may operate to receive log event information from CPE devices 102 implemented in the field (e.g., CPE device B 102b and CPE device C 102c) and evaluate the log event information against a set of patterns 206, 208. The patterns 206, 208 may include one or a combination of log events 204 that correspond to a device anomaly/malfunction. For example, a pattern 206, 208 identified in the set of logs 202 may be correlated with a device anomaly/malfunction. Device anomalies may be determined by examining the logs 202 themselves or may be correlated to customer complaints, service calls, or other information available to the log event analyzer 112. In some examples, the set of log events may be pre-processed (e.g., aggregated, normalized) at the intermediate server 108 before being provided to the log event analyzer 112. The intermediate server 108 may also provide certain log events to a CPE device vendor server 114 and/or to the development/test system 104.

According to one example implementation, CPE device B 102b and CPE device C 102c may be in communication with a CPE device management server 106. The CPE device management server 106 may include one or more servers that may operate to provide remote management of thousands or millions of CPE devices 102 over the network 122. Example device management services provided by the CPE device management server 106 can include service activation and reconfiguration, remote subscriber support, firmware updates and configuration management, diagnostics and monitoring, and other device management services. In some examples, the CPE device management server 106 may further operate to issue a command to connected CPE devices 102 to gather and upload, to the intermediate server 108, log events 204 recorded by those CPE devices 102 since a last upload. In examples, the CPE device management server 106 may trigger the upload of log events 204 periodically or on demand of a system administrator. In examples, the CPE device management server 106 manages thousands or millions of CPE devices 102, and the upload of log data may allow the log event analyzer 112 to have visibility into the performance (and corresponding patterns of log events) of a very large number of machines.

In one example, the log event analyzer 112 may perform string recognition on received sets of log event information for detecting log events 204 that match a pattern 206, 208. In some examples, the pattern 206, 208 may be included in patterns 206, 208 received from the development/test system 104. For example, in a development or testing phase, an initial set of patterns 206, 208 may be identified, captured, and provided to the log event analyzer 112. As mentioned above, in examples, the initial patterns 206, 208 identified during development or testing may identify log events that cause issues that are considered negligible or not applicable to a production/field environment such that if the issues are seen in production (e.g., at an unacceptable rate), mitigation processes can be determined to allow the CPE devices 102 to effectively mitigate the issues.

In some examples, the patterns 206, 208 may further include patterns self-learned by the log event analyzer 112. For example, the log event analyzer 112 may utilize a variety of artificial-intelligence and supervised or unsupervised learning techniques to identify anomalies/malfunctions in the operation of the CPE devices 102 and correlate those to patterns 206, 208 of log events 204 in logs 202 received from the CPE devices 102. In some examples, customer complaints to call centers and technician dispatches (e.g., service call information) may be monitored and logs 202 from those complaints may be analyzed and correlated to the log events 204 received from the CPE devices 102. When such patterns 206, 208 are identified, they may be provided (along with the initial patterns 206, 208 identified in development and testing) to the CPE devices 102, as described herein.

In some examples, the patterns 206, 208 are time limited. For example, a combination of log events 204 that are correlated to an anomaly/malfunction in performance of a CPE device 102 may only be considered a pattern 206, 208 if they happen within a particular time period from each other or from the reporting of the anomaly/malfunction. For example, depending on the nature of the anomaly/malfunction, a rolling window of one minute, one hour, one day, or other period may be used to filter log events 204 and look for patterns 206, 208 within the log events of particular machines.

When a pattern 206, 208 is detected by the log event analyzer 112, a match count may be performed to determine a number of times a pattern 206, 208 has been detected. For example, a determination may be made as to a number of times the pattern 206, 208 has been detected on the CPE device 102 associated with the event log. Further, a determination may be made as to a number of times the pattern 206, 208 has been detected across all or a set of CPE devices 102. In examples, the match count may be limited to the number of separate CPE devices 102 on which the pattern 206, 208 was observed in a particular time period. In other examples, the total number of patterns 206, 208 observed (including multiple from the same CPE device 102) may be used to calculate the match count.

A detected pattern 206, 208 may further be evaluated to determine a category. In some examples, a detected pattern 206, 208 may be categorized into a pattern category (e.g., emergency, critical, major, warning, debug, notice, info, error, or other). In some examples, pattern categorization may be based on impacts, contacts, and dispatches. For example, detected patterns 206, 208 of log event information may be evaluated against a number of customer service calls associated with resolving anomalies/malfunctions corresponding to the detected patterns 206, 208, where a critical or major pattern category may be assigned to a detected pattern 206, 208 of log event information determined to be associated with a higher number of customer service calls than another detected pattern. In another example, an emergency or critical pattern, for example, may be associated with the CPE device 102 being inoperable, while a major pattern may be associated with the CPE device 102 temporarily not operating as expected. In other examples, the category may be related to the match count exceeding a particular threshold.

In other examples, when a pattern 206, 208 of a particular type of category (e.g., critical) is detected, the log event analyzer 112 may operate to trigger an advanced log upload. For example, the log event analyzer 112 may command the CPE device management server 106 to trigger an upload of detailed event log information from CPE devices 102 in the field whose log events 204 include the detected pattern type. In some examples, the CPE device management server 106 may instruct the CPE devices 102 to upload detailed event log information to the intermediate server 108, which may then, for example, send the detailed field event log information to the development/test system 104 for further development and testing. In other examples, detected patterns 206, 208 of a particular category (e.g., critical) may be communicated to the log event analyzer 112 for further analysis. In other examples, detected patterns 206, 208 of a particular category (e.g., critical) may be communicated to the CPE device vendor system 114 for further analysis. Additional logs may further be collected and analyzed by engineers and the vendors to determine root causes and to troubleshoot.

According to an example, a mitigation process comprising one or a combination of mitigation actions that can be performed by the CPE device 102 as a temporary or permanent workaround for a device anomaly/malfunction may be discovered in relation to a discovered pattern 206, 208 of log event information. In some examples, upon discovery of a new pattern 206, 208 of log event information associated with a device anomaly/malfunction and a determination of a mitigation process as a workaround to effectively mitigate the device anomaly/malfunction, the log event analyzer 112 may operate to communicate the new pattern 206, 208 to the CPE device management server 106. The CPE device management server 106, for example, may operate to provide instructions to the CPE devices 102 that enables the CPE devices 102 to identify the new pattern 206, 208 in its own log events and to perform the determined mitigation process to resolve the issue corresponding to the new pattern 206, 208. For example, the CPE device management server 106 may provide the CPE device 102 with a set of patterns 206, 208 to look for in its own log data and instructions about which mitigation actions to perform when the patterns are detected. Accordingly, the CPE device 102 may be enabled to self-correct or self-mitigate device anomalies/malfunctions. As can be appreciated, this can not only improve operation of the CPE device 102, but it can further reduce or eliminate customer service calls related to the device anomalies/malfunctions.

In some examples, the mitigation processes can be separately executable and made available by an application programming interface (API) (and/or a user interface (UI) associated with the CPE device management server) as choices for addressing any initial patterns 206, 208 correlated to device anomalies or newly discovered patterns 206, 208. In this manner, the CPE devices 102 can be instructed by the service provider 116 (through the CPE device management server 106) to implement mitigation strategies to avoid device anomalies/malfunctions even before a vendor of the particular CPE devices 102 resolves the anomalies/malfunctions or deploys a more permanent fix. In some examples, the variety of mitigation processes can be presented (e.g., as a menu) to an IT professional of the service provider 116 to easily and quickly deploy a workaround comprising one or a combination of the mitigation actions to a large number of CPE devices 102 for a recognized pattern 206, 208 of log events 204.

According to one illustrative example, a discovered pattern 206, 208 of log event information may include an event of a particular temperature reading of a CPE device 102, which when detected, is determined to correlate with a device failure. Accordingly, this pattern 206, 208 may be uploaded to the CPE device 102 with a mitigation process to mitigate failure of the device. For example, the mitigation process may include at least one mitigation action that may including shutting off a particular component of the device (e.g., WI-FI interface, 5G data interface) for a particular time period or until the temperature is within a desired range. Additional stepped or combined mitigation actions may also be included in the mitigation process.

Further, in some examples, the log event analyzer 112 may use other information about the CPE devices 102 and/or particular customers in determining whether a set of log event information is a pattern 206, 208. For example, the log event analyzer 112 may analyze a geographic location of a customer or the customer's CPE device 102 and/or date/time information in determining a particular pattern 206, 208 of log event information. In the temperature reading example above, the pattern 206, 208 may only be identified for a group of CPEs (e.g., CPE device B 102b) that may have a common characteristic, such as a group of devices are determined to be in locations known to have warm-weather climates during at least a portion of the year. In some examples, a mitigation process and/or the log event analyzer 112 may use other information about the CPE devices 102 and/or particular customers in selecting a mitigation process. For example, a customer of CPE device B 102b that has a temperature-related failure in the summer months in Arizona may be provided with a message instructing the customer to ensure the device is in an air-conditioned place. By contrast, a customer of CPE device C 102c that has a temperature-related failure in the winter months in Montana may be instructed to ensure that the device is not placed near a heating element. In this manner, the identified patterns 206, 208 and/or the corresponding mitigation processes may be customized or limited based on other information about a customer and/or the CPE device 102 itself.

Figure 3A:
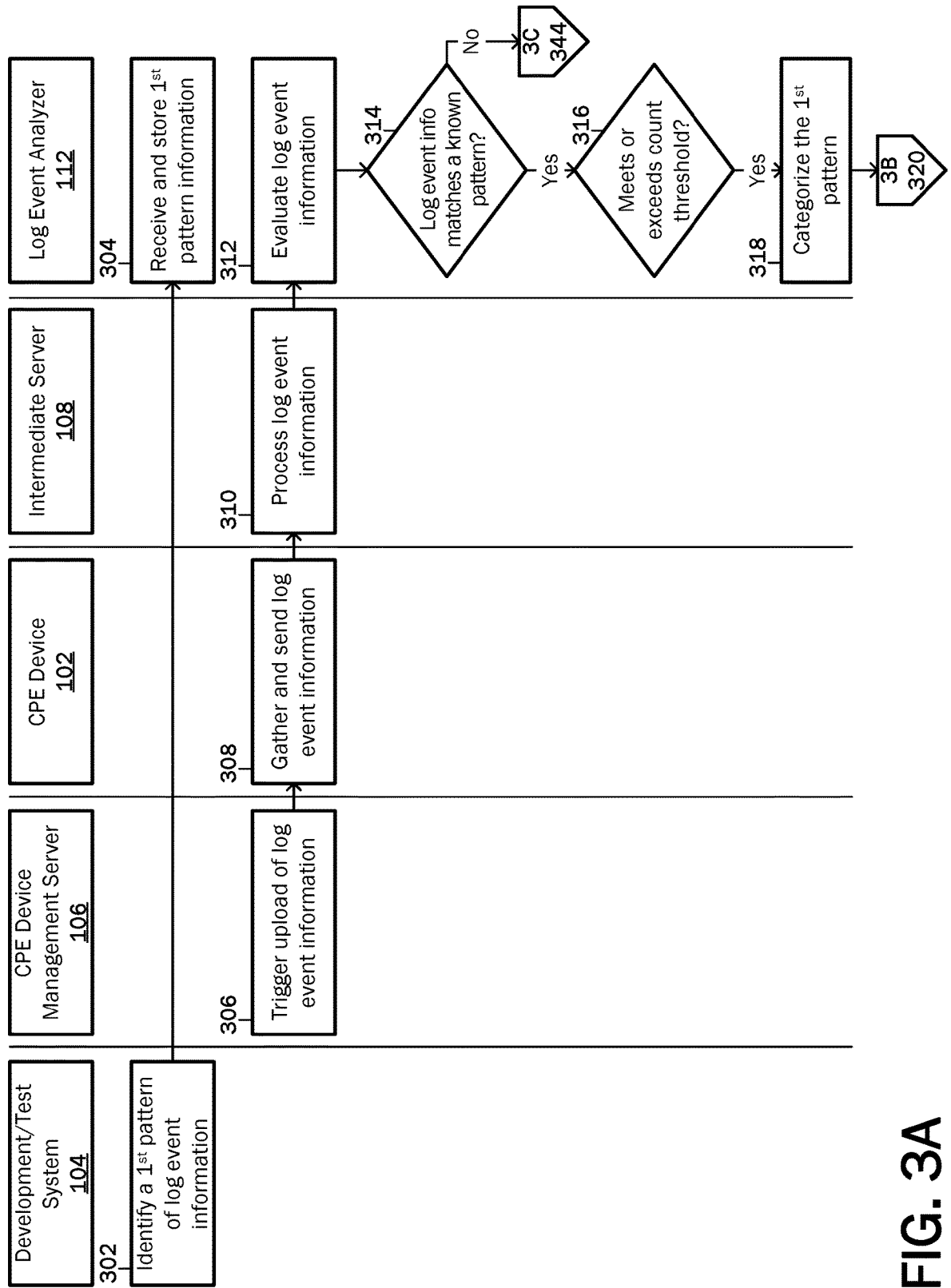
FIGS. 3A-3E illustrate a sequence diagram of an example process for mitigating anomalies in a network device in accordance with an embodiment.

FIGS. 3A-3E depict a sequence diagram of an example process for mitigating anomalies in a network device in accordance with an embodiment. With reference now to FIG. 3A, at operation 302, log event information from a first group of CPE devices 102a that may operate in a test/lab setting may be collected and evaluated. For example, the first group of CPE devices 102a may include new hardware, firmware, or software that may be under test in the test/lab setting. At operation 302, a first pattern 206 of log event information associated with a device anomaly/malfunction may be identified. In an example, the first pattern 206 may be identified in association with a device anomaly/malfunction that is observed to occur at a degree that does not meet an occurrence, severity, or another type of threshold. Thus, device anomaly/malfunction may be considered negligible or not applicable to a production environment, and the new hardware, firmware, or software that is under test may be deployed in the field and a record of the first pattern 206 (e.g., log events 204 included in the first pattern and associated anomaly/malfunction identified in testing) may be provided to the log event analyzer 112. At operation 304, the log event information associated with the first pattern 206 may be received and stored by the log event analyzer 112.

At operation 306, the CPE device management server 106 may trigger an upload of log event information from a plurality of CPE devices 102 (e.g., CPE device B 102b and CPE device C 102c) implemented in the field/in production. In an example, the upload may be triggered periodically. In another example, the upload may be triggered on demand of a system administrator. In examples, at operation 308, log event information may be gathered and transmitted from thousands or millions of CPE devices 102 to one or more intermediate servers 108. At operation 310, the intermediate server(s) 108 may receive, pre-process (e.g., aggregated, normalized), and provide the log event information to the log event analyzer 112.

At operation 312, the log event information may be evaluated by the log event analyzer 112. For example, the log event analyzer 112 may perform string recognition on received sets of log event information for detecting log events that match the first pattern 206. For instance, if, at decision operation 314, log events matching the first pattern 206 are detected in the collected log event information, at decision operation 316, a determination may be made as to whether the first pattern 206 and/or a device anomaly/malfunction corresponding to the detected first pattern 206 may be observed at an unacceptable rate (e.g., at a degree that meets or exceeds the threshold). When the first pattern 206 is determined to meet or exceed the unacceptable rate, the first pattern 206 may be categorized at operation 318. For example, the first pattern 206 may be categorized as an emergency, critical, major, warning, debug, notice, info, error, or other pattern type. In some examples, pattern categorization may be based at least in part on a number of impacts, contacts, and dispatches associated with the first pattern 206.

Figure 3B:
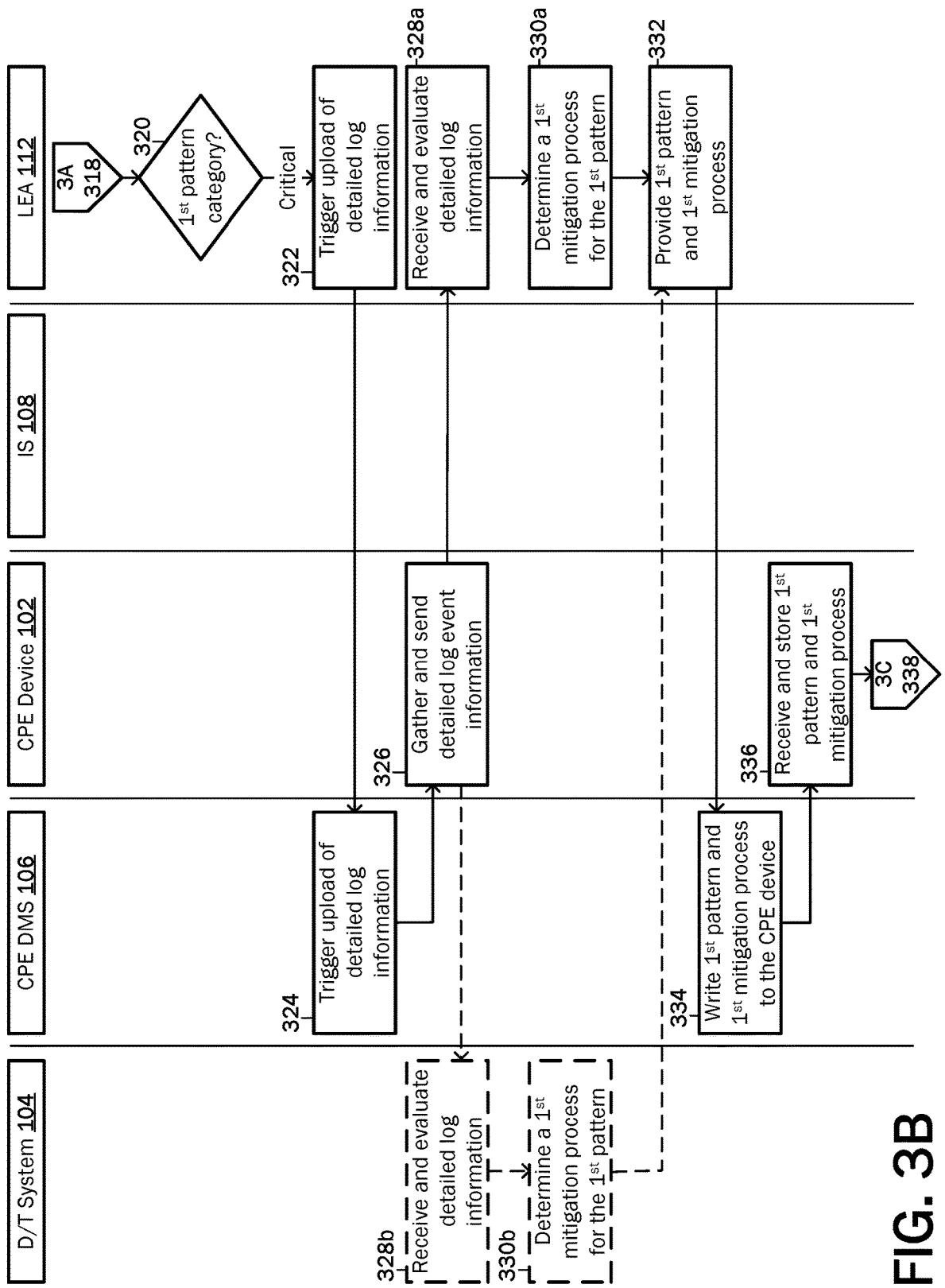
Figure 3C:
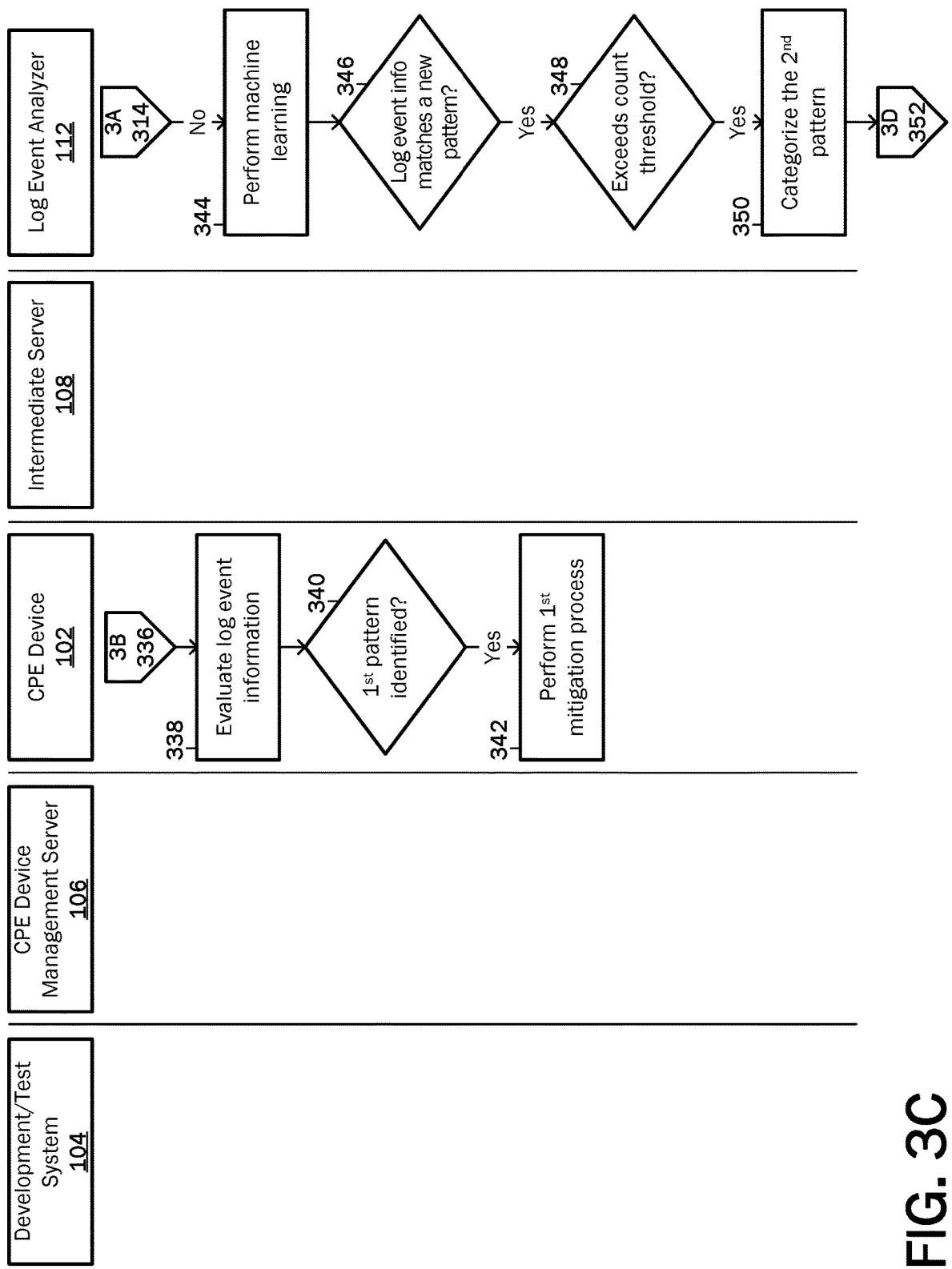

Continuing to FIG. 3B, at decision operation 320, a pattern of a particular type of category (e.g., critical) may be detected, and at operation 322, the log event analyzer 112 may operate to trigger an upload of detailed log information from the CPE devices 102 operating in the field whose log events include the first pattern 206. In some examples, the log event analyzer 112 may instruct the CPE device management system 106 to request (operation 324) the detailed log information from the CPE devices 102. In one example, at operation 326, the CPE devices 102 may gather and send their detailed log event information to the log event analyzer 112 to be evaluated (operation 328a). In another example, the detailed log event information may be sent to the development and testing system 104 to be evaluated (operation 328b). For example, the detailed log information may be evaluated to determine (operation 330a, 330b) a first mitigation process that may be used to effectively mitigate the anomaly/malfunction associated with the first pattern 206. The first mitigation process may include one or a combination of mitigation actions that the CPE devices 102 are configured to perform.

At operation 332, the first pattern of log event information and the first mitigation process may be provided to the CPE device management system 106, and at operation 334, the first pattern 206 of log event information and the first mitigation process may be written to the CPE devices 102. In an example, the first pattern 206 of log event information and the first mitigation process may be written to a selected group of the CPE devices 102. For example, the first pattern 206 may be detected in the selected group of the CPE devices 102 and not in another group of CPE devices 102, or the first mitigation process may be applicable to the selected group and not applicable to another group of devices. At operation 336, the first pattern 206 of log event information and the first mitigation process may be received and stored by the CPE devices 102. For instance, and continuing to FIG. 3C, a software or firmware update may be pushed to the CPE devices 102 by the CPE device management server 106, where the software or firmware update may include the first pattern 206 of log event information and instructions that cause the CPE devices 102 to evaluate (operation 338) their own log event information for identifying (decision operation 340) the first pattern 206. The software or firmware update may further include instructions that cause the CPE devices 102 to perform (operation 342) the one or combination of mitigation actions included in the first mitigation process when the first pattern 206 is detected. Accordingly, the CPE devices 102 may operate to self-correct or self-mitigate the device anomaly/malfunction associated with the first pattern 206 detected in their log event information.

In some examples, various artificial-intelligence and supervised or unsupervised learning techniques may be used by the log event analyzer 112 to self-learn additional patterns of log event information that may be correlated to a device anomaly/malfunction. For instance, log event information received from CPE devices 102 that may be determined to not match a known pattern at decision operation 314 (FIG. 3A) may be further evaluated by the log event analyzer 112 using machine learning techniques at operation 344. At decision operation 346, a determination may be made that a new pattern (second pattern 208) of log event information can be correlated to a device anomaly/malfunction, and at decision operation 348, a determination may be made as to whether the device anomaly/malfunction corresponding to the second pattern 208 may be observed at an unacceptable rate (e.g., at a degree that meets or exceeds a threshold). When the second pattern 208 is determined to meet or exceed the unacceptable rate, the second pattern 208 may be categorized at operation 350.

Figure 3D:
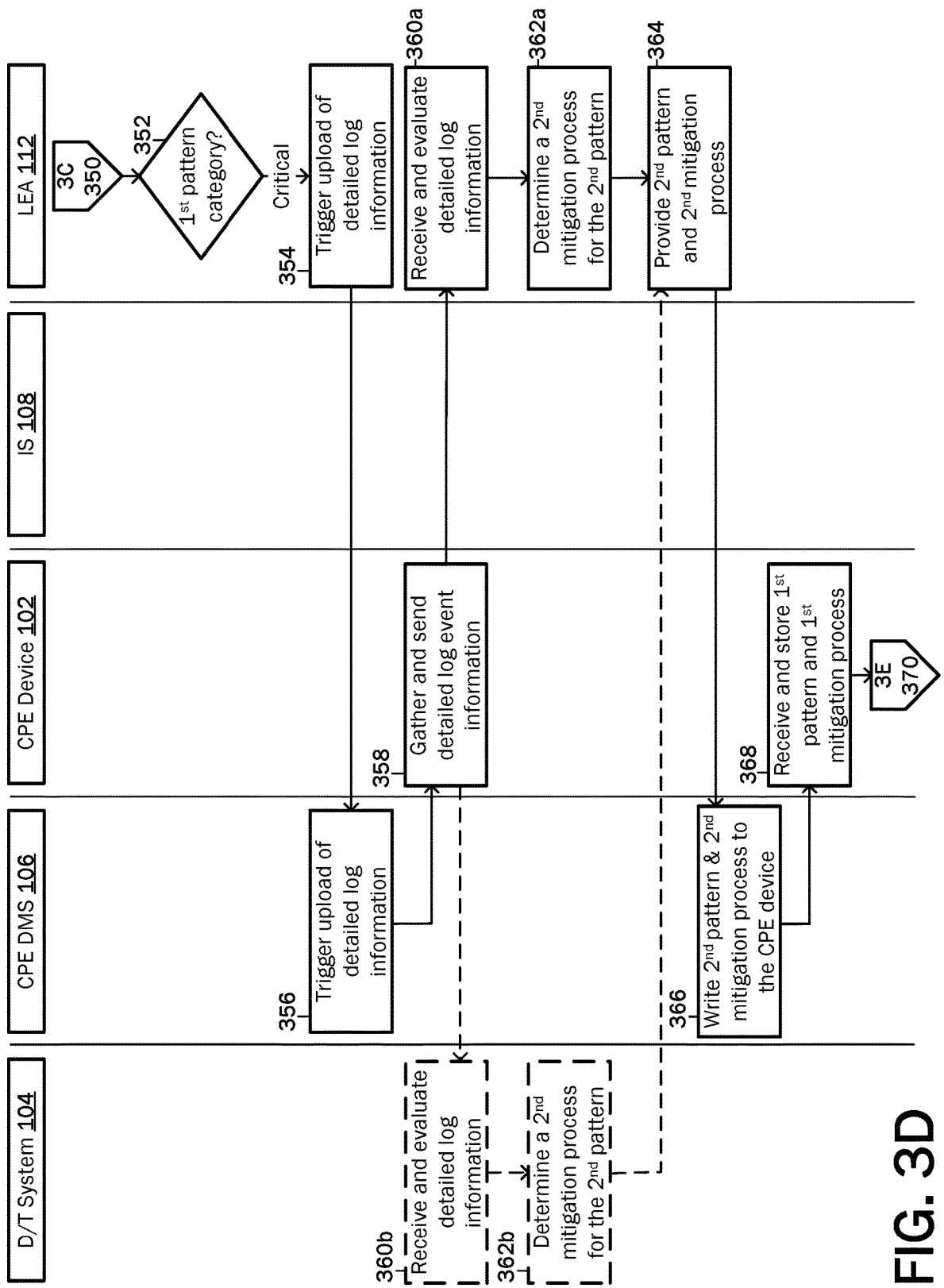
Figure 3E:
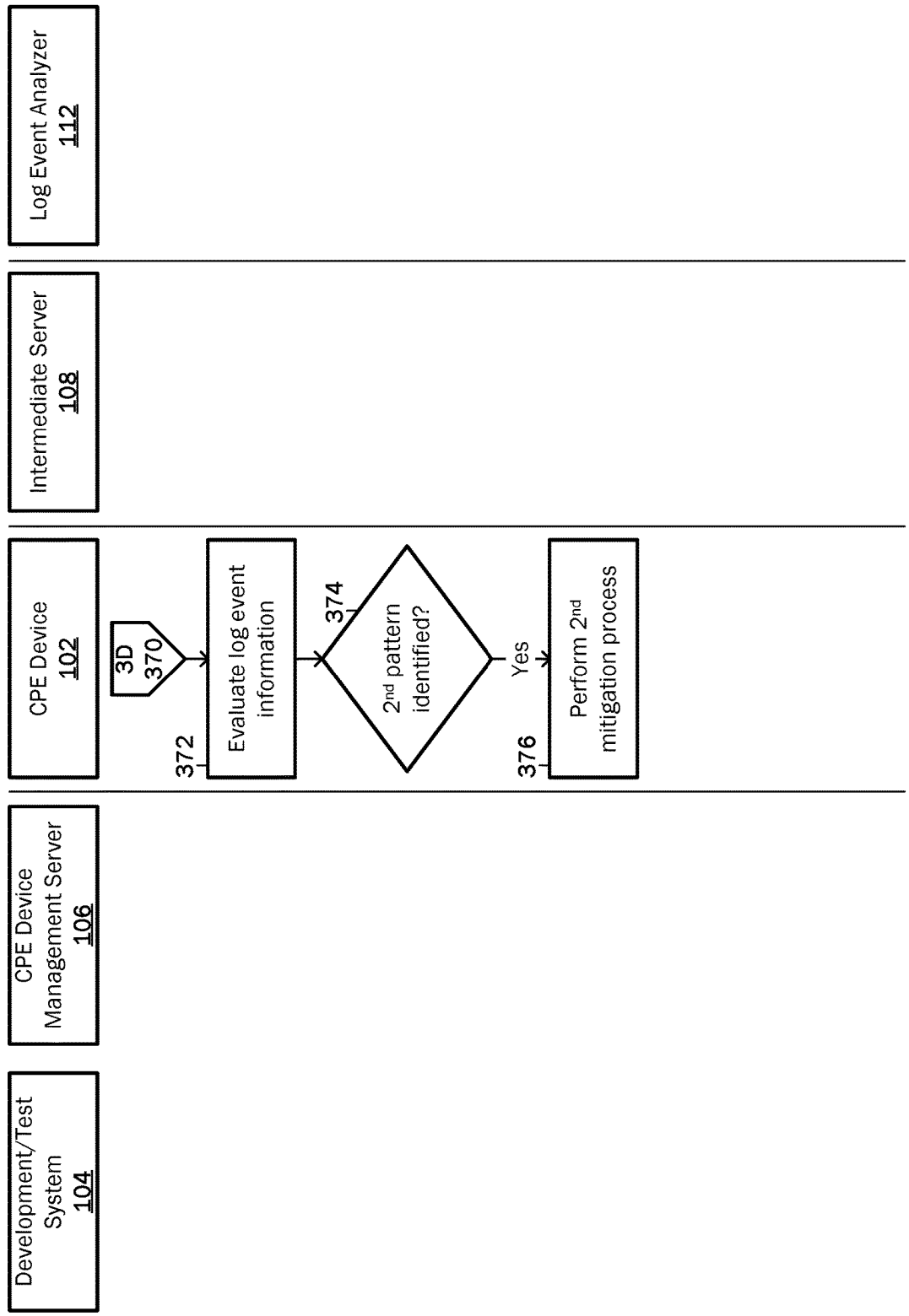

Continuing to FIG. 3D, at decision operation 352, the second pattern 208 may be determined to be of a particular category type (e.g., critical), and, in some examples, at operation 354, the log event analyzer 112 may further operate to trigger an upload of detailed log information from the CPE devices 102 operating in the field whose log events 204 include the second pattern 208. In some examples, the log event analyzer 112 may instruct the CPE device management system 106 to request (operation 356) the detailed log information from the CPE devices 102. In one example, at operation 358, the CPE devices 102 may gather and send their detailed log event information to the log event analyzer 112 to be evaluated (operation 360a). In another example, the detailed log event information may be sent to the development and testing system 104 to be evaluated (operation 360b). For example, the detailed log information may be evaluated to determine (operation 362a, 362b) a second mitigation process that may be used to effectively mitigate the anomaly/malfunction associated with the second pattern 208. The second mitigation process may include one or a combination of mitigation actions that the CPE devices 102 are configured to perform.

At operation 364, the second pattern 208 of log event information and the second mitigation process may be provided to the CPE device management system 106, and at operation 366, the second pattern 208 of log event information and the second mitigation process may be written to the CPE devices 102. In an example, the second pattern 208 of log event information and the second mitigation process may be written to a selected group of the CPE devices 102. For example, the second pattern 208 may be detected in the selected group of the CPE devices 102 and not in another group of CPE devices 102, or the second mitigation process may be applicable to the selected group and not applicable to another group of devices. At operation 368, the second pattern 208 of log event information and the second mitigation process may be received and stored by the CPE devices 102. For instance, and continuing to FIG. 3E, a software or firmware update may be pushed to the CPE devices 102 by the CPE device management server 106, where the software or firmware update may include the second pattern 208 of log event information and instructions that cause the CPE devices 102 to evaluate (operation 372) their own log event information for identifying (decision operation 374) the second pattern 208. The software or firmware update may further include instructions that cause the CPE devices 102 to perform (operation 376) the one or combination of mitigation actions included in the second mitigation process when the second pattern 208 is detected. Accordingly, the CPE devices 102 may operate to self-correct or self-mitigate the device anomaly/malfunction associated with the second pattern 208 detected in their log event information.

Figure 4:
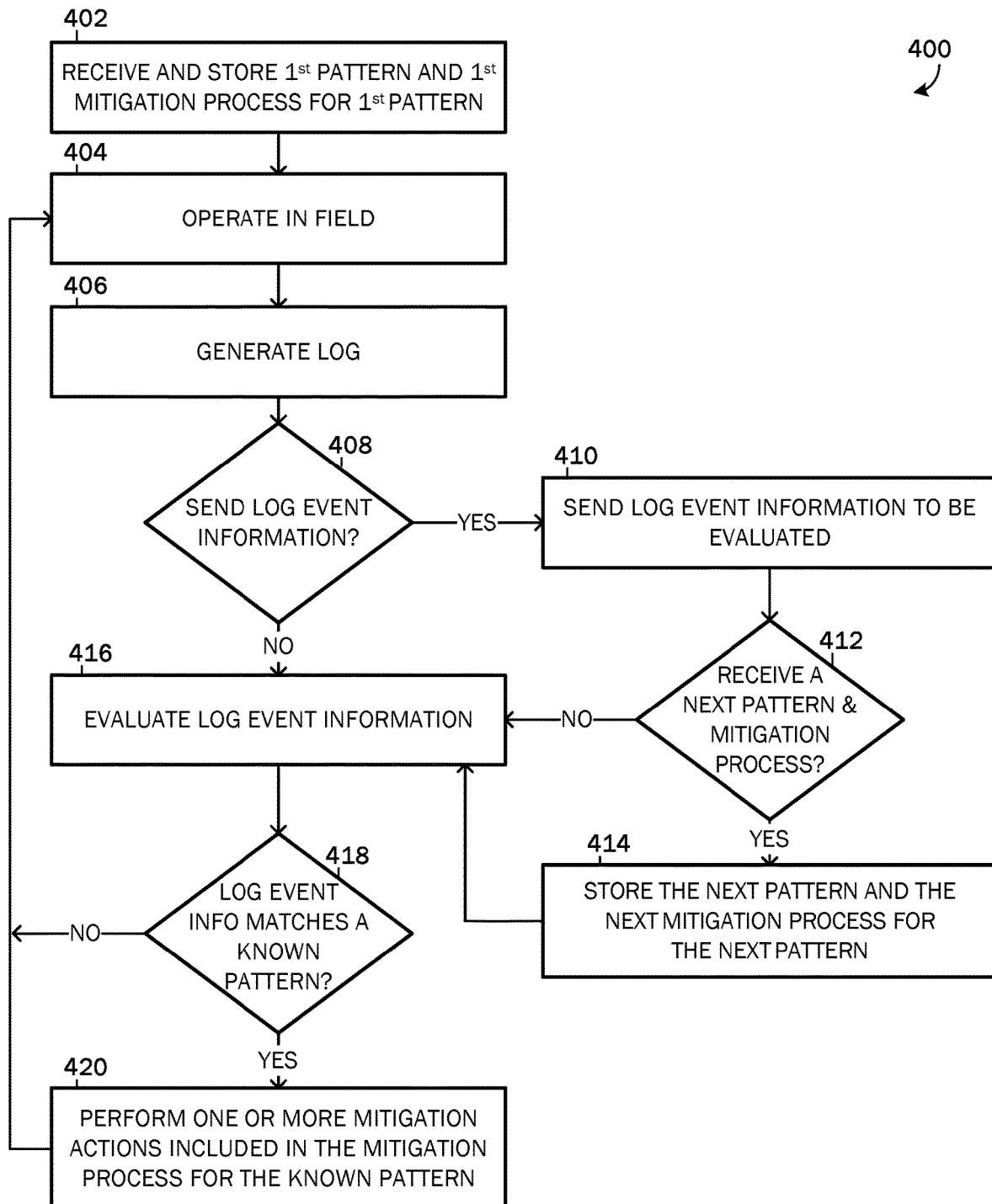
FIG. 4 illustrates an example method for mitigating anomalies in a network device in accordance with an embodiment.

FIG. 4 illustrates an example method 400 including various operations that may be performed by a CPE device 102 for mitigating anomalies in a network device in accordance with an embodiment. At operation 402, a first pattern 206 of log events 204 and instructions to perform mitigation actions included in a first mitigation process when the first pattern 206 is detected may be received and stored by a CPE device 102. For example, the first pattern 206 and instructions to perform the first mitigation process are received when the CPE device 102 is manufactured, at initial load of software or firmware on the CPE device 102, as part of a software or firmware update, etc.

At operation 404, the CPE device 102 may operate in the field, for example, at a customer premises. As described above, the CPE device 102 may operate as a network device, such as residential network gateway device. At operation 406, information about events 204 associated with its software, firmware, and/or hardware may be logged by the CPE device 102.

At decision operation 408, a determination may be made as to whether to send logged event information to a requesting device. In some examples, the CPE device 102 may be configured to send (operation 410) log event information according to a schedule. In other examples, the CPE device 102 may receive a request or may otherwise be triggered to upload (operation 410) log event information to the CPE device management server 106 or to an intermediate server 108 to be evaluated by the log event analyzer 112. In some examples, the CPE device 102 may receive a request or may otherwise be triggered to upload (operation 410) detailed log event information to the CPE device management server 106 or to an intermediate server 108 to be evaluated by the log event analyzer 112, the development/test system 104, and/or the CPE device vendor server 114.

In some examples, a new (e.g., second) pattern 208 of log events 204 may be correlated to a device anomaly/malfunction based on received log event information, and a new mitigation process may be determined as a temporary or permanent work around for the anomaly/malfunction. When a new pattern 208 and associated mitigation process is received at decision operation 412 (e.g., in a firmware update), the new pattern 208 and associated mitigation process may be stored by the CPE device 102 at operation 414.

At operation 416, the information logged by the CPE device 102 about its software, firmware, and/or hardware events 204 may be evaluated by the CPE device 102. For example, the CPE device 102 may make a determination whether the log event information matches a known pattern (e.g., the first pattern 206, a new pattern 208) at decision operation 418. When a known pattern 206, 208 is detected in the CPE device's log event information, at operation 420, one or more mitigation actions included in the mitigation process associated with the detected pattern may be performed. As an example, the CPE device 102 may perform an auto recovery, rerun WAN auto detection, restart driver, send a message, etc., to mitigate/resolve the anomaly/malfunction corresponding to the detected pattern 206, 208. The method 400 may continue to operation 404, where the CPE device 102 may continue to operate in the field, logging, sharing, and evaluating information about events 204 associated with its software, firmware, and/or hardware.

Figure 5:
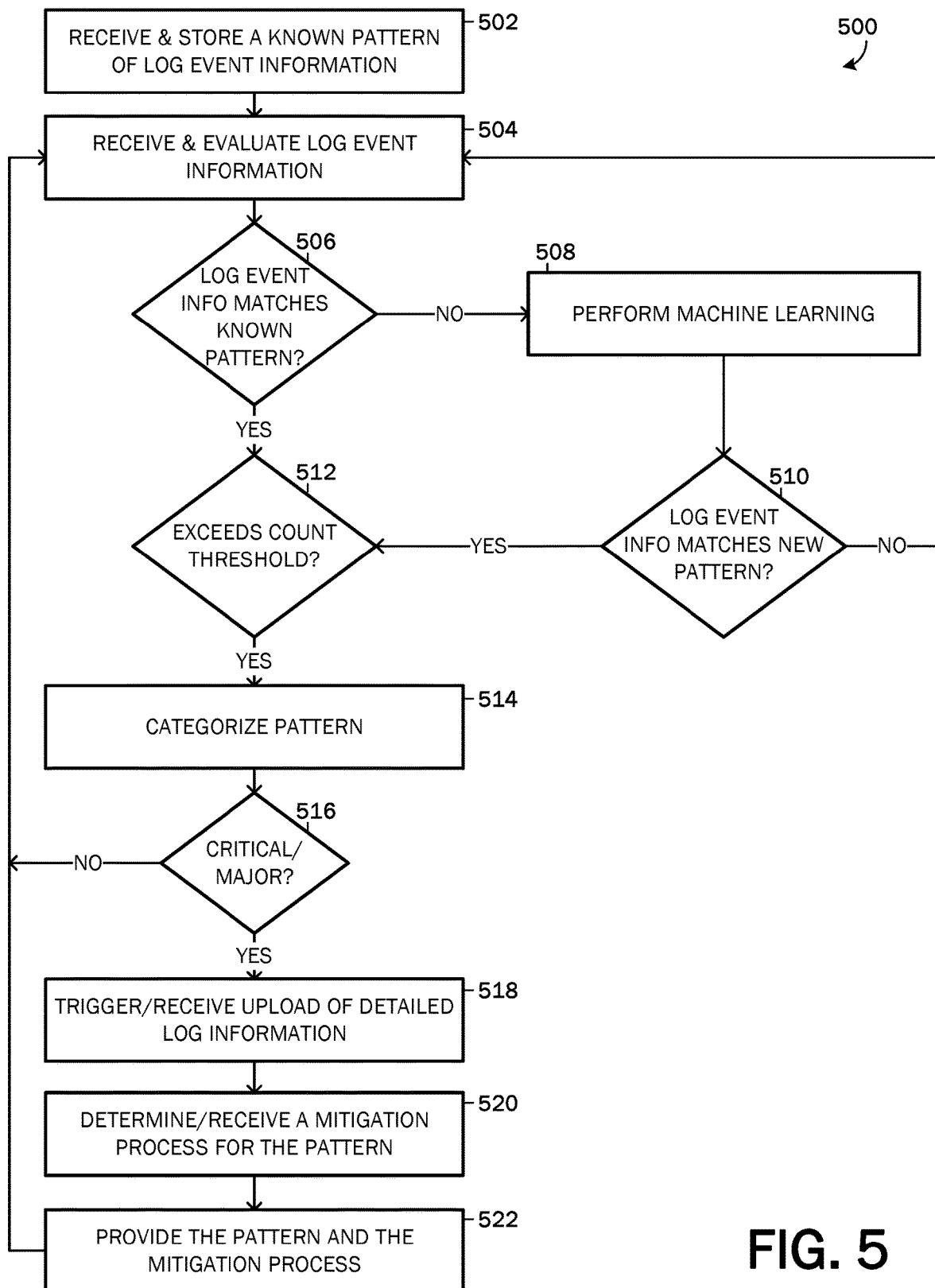
FIG. 5 illustrates another example method for mitigating anomalies in a network device in accordance with an embodiment.

FIG. 5 illustrates an example method 500 including various operations that may be performed by the log event analyzer 112 for mitigating anomalies in a network device in accordance with an embodiment. At operation 502, information about known patterns (e.g., a first pattern 206) of CPE device log events 204 may be received. According to an example, the received information may include log event information recorded by a plurality of devices operating in a lab/test environment. For example, the known patterns may have been identified in association with a device anomaly/malfunction during testing of new CPE device hardware, firmware, or software. The anomaly/malfunction may have been observed to occur at a degree that does not meet an occurrence, severity, or another type of threshold; and thus, the new hardware, firmware, or software under test may have been granted authorization to be deployed into new and/or existing CPE devices 102b,c operating in the field. These deployed CPE devices 102b,c may then be monitored in the field for detecting the known patterns and associated device anomaly/malfunction.

For example, at operation 504, log event information may be received from a plurality of CPE devices 102b, 102c implemented in the field/in production and evaluated. In one example, the log event analyzer 112 may trigger the upload of log event information. In another example, the upload may be triggered periodically or on demand of a system administrator. In some examples, the log event information may be preprocessed (e.g., aggregated, normalized) by one or more intermediate servers 108 prior to being received by the log event analyzer 112. Evaluating the log event information may include performing string recognition for detecting log events that match the known patterns.

At decision operation 506, a determination may be made as to whether log events 204 matching a known pattern is detected. When a known pattern of log event information is not detected, at operation 508, the log event information may be analyzed using an unsupervised machine learning technique (e.g., feed-forward neural network) to identify new patterns of log event information corresponding to other device anomalies/malfunctions. For example, when a determination is made at decision operation 510 that a new pattern is identified, or when a determination is made that log events 204 matching a known pattern are detected in received log event information at decision operation 506, the method 500 may proceed to decision operation 512, where a determination may be made as to whether the known/new pattern is observed at an unacceptable rate (e.g., at a degree that meet or exceeds an occurrence, severity, or another type of threshold). For example, a match count may be performed to determine a number of times the known/new pattern is detected (e.g., on unique devices, a total number including multiple from the same device). When the match count exceeds the threshold, the pattern may be categorized at operation 514 into a pattern category. In some examples, categorization may be based at least in part on the match count, impacts, contacts, and dispatches, and/or operability of the CPE devices 102. When the known/new pattern is categorized as a particular pattern type (e.g., critical or major) at decision operation 516, an advanced/detailed log upload may be triggered at operation 518 from CPE devices 102 in the field whose log events 204 include the detected known/new pattern. The advanced/detailed log information may be received by the development/test system 104, CPE device vendor system 114, and/or the log event analyzer 112 for further analysis. Troubleshooting of CPE devices 102 and/or root cause analyses may be performed for selecting a mitigation process for mitigating or resolving the device anomaly/malfunction associated with the known/new pattern. In some examples, the mitigation process may be determined (operation 520) by the log event analyzer 112, or in other examples, the mitigation process may be received by the log event analyzer 112. At operation 522, the known/new pattern of log event information and the mitigation process determined to mitigate/resolve the associated device anomaly/malfunction may be provided to the CPE device management system 106 to be written to the CPE devices 102 (e.g., in a software or firmware update). Accordingly, the CPE devices 102 may be instructed to evaluate their own log event information for identifying the known/new pattern and to perform one or a combination of mitigation actions included in the associated mitigation process when the known/new pattern is detected to self-correct or self-mitigate the device anomaly/malfunction associated with the known/new pattern.

Figure 6:
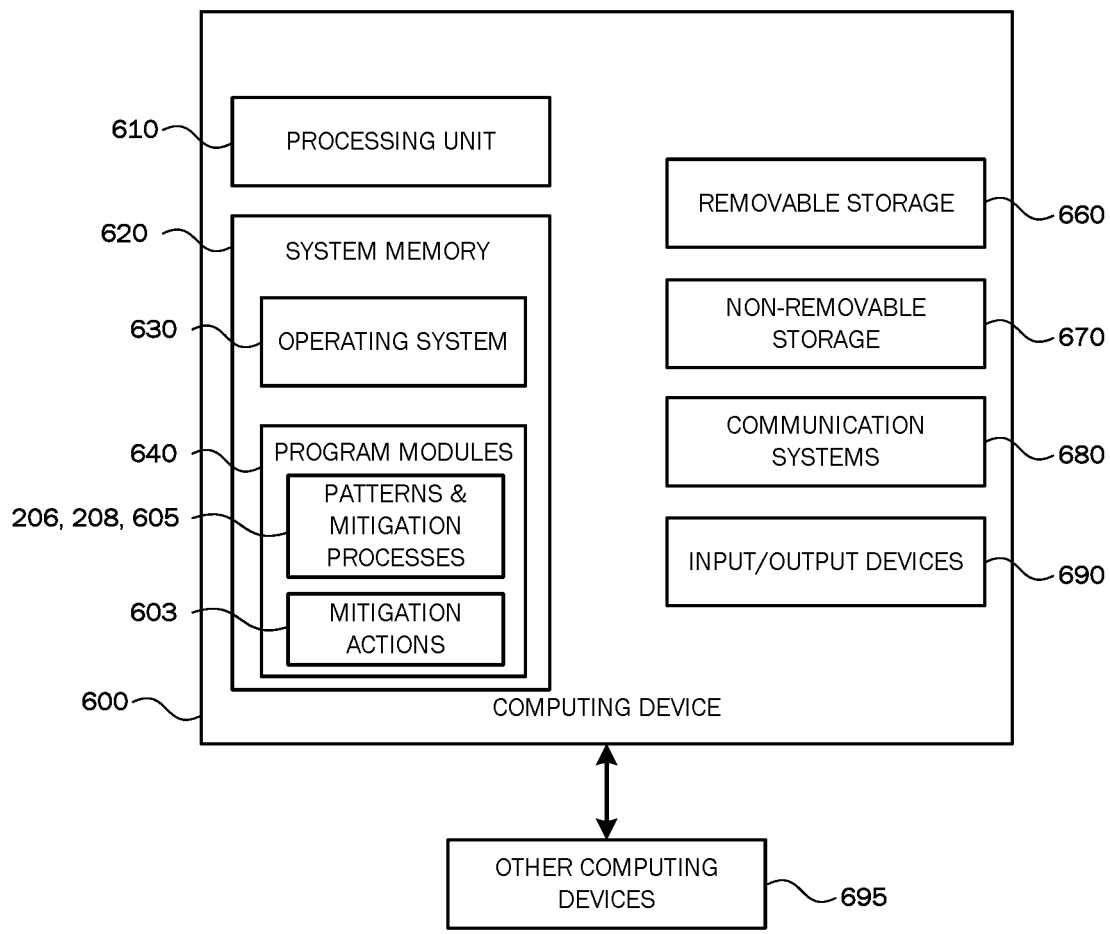
FIG. 6 is a block diagram of a computing device with which one or more aspects of the disclosure may be implemented in accordance with an embodiment.

FIG. 6 is a system diagram of a computing device 600 according to an example. The computing device 600, or various components and systems of the computing device 600, may be integrated or associated with one or more of the computing devices described above with respect to FIG. 1. As shown in FIG. 6, the physical components (e.g., hardware) of the computing device 600 are illustrated and these physical components may be used to practice the various aspects of the present disclosure. The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. The program modules 640 may be responsible for performing one more of the operations of the methods described above. A number of different program modules and data files may be stored in the system memory 620. While executing on the processing unit 610, the program modules 640 may perform the various processes described above. In an example, a plurality of mitigation actions 603 and one or more patterns 206, 208 of log event information and one or more associated mitigation process 605 including instructions to perform one or a combination of the mitigation actions 603 may be stored in the system memory 620.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695 such as, for example, routing engines, gateways, signings systems and the like. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 690. These input/output devices 690 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for mitigating anomalies in a network device comprising:
   receiving log event information for a plurality of network devices;
   determining a first pattern of log event information correlated to an anomaly of at least a first network device;
   selecting a first mitigation process including one or more mitigation actions; and
   instructing the first network device to monitor its own log event information for the first pattern of log event information and, when the first pattern of log event information is detected, to implement the first mitigation process.

2. The method of claim 1, wherein determining the first pattern of log event information comprises:
   receiving the log event information; and
   performing string recognition for detecting log events in the log event information that match the first pattern.

3. The method of claim 2, wherein instructing the first network device comprises instructing the plurality of network devices to each monitor its own log event information for the first pattern of log event information and, when the first pattern of log event information is detected, to implement the first mitigation process.

4. The method of claim 2, further comprising:
   when the first pattern is detected in the log event information, determining a match count;
   when the match count meets a count threshold, categorizing the first pattern; and
   based on the category, causing the first network device to perform an upload of detailed log information from the first network device.

5. The method of claim 4, wherein determining the match count comprises correlating the first pattern to customer complaints and service calls information.

6. The method of claim 1, further comprising:
   using unsupervised machine learning techniques to determine a second pattern of log event information correlated to a second anomaly of at least the first network device;
   selecting a second mitigation process including the one or more mitigation actions; and
   instructing the first network device to monitor its own log event information for the second pattern of log event information and, when the second pattern of log event information is detected, to implement the second mitigation process.

7. The method of claim 1, wherein receiving log event information for the plurality of network devices comprises receiving log event information for a plurality of network devices operating at a plurality of customer premises.

8. A method for mitigating anomalies in a network device, comprising:
   storing a plurality of mitigation actions at the network device;
   logging events associated with software, firmware, or hardware of the network device;
   receiving a first pattern of log event information correlated to an anomaly and a first mitigation process to implement when the first pattern of log event information is detected;
   monitoring, at the network device, logged events for the first pattern of log event information; and
   when the first pattern of log event information is detected, implementing the first mitigation process at the network device, wherein the first mitigation process includes one or more of the mitigation actions.

9. The method of claim 8, wherein receiving the first pattern of log event information and the first mitigation process comprises receiving the first pattern of log event information and the first mitigation process in a software or firmware upgrade.

10. The method of claim 8, wherein monitoring logged events for the first pattern of log event information comprises performing string recognition for detecting log events in the log event information that match the first pattern.

11. The method of claim 10, wherein monitoring logged events for the first pattern of log event information comprises detecting log events that match the first pattern within a limited time period.

12. The method of claim 8, further comprising uploading logged events to a server for evaluation.

13. The method of claim 8, further comprising:
receiving a second pattern of log event information correlated to a second anomaly and a second mitigation process to implement when the second pattern of log event information is detected;
monitoring logged events for the second pattern of log event information; and
when the second pattern of log event information is detected, implementing the second mitigation process, wherein the second mitigation process includes one or more of the mitigation actions.

14. The method of claim 8, further comprising:
generating a log of detailed information about the logged events;
receiving a request for the detailed information about the logged events; and
providing the detailed information about the logged events.

15. A system for mitigating anomalies in a network device, comprising:
at least one processor; and
memory storing instructions that, when executed by the at least one processor, cause the system to:
receive log event information for a plurality of network devices;
determine a first pattern of log event information correlated to an anomaly of at least a first network device;
select a first mitigation process including one or more mitigation actions; and
instruct the first network device to monitor its own log event information for the first pattern of log event information and, when the first pattern of log event information is detected, to implement the first mitigation process.

16. The system of claim 15, wherein the first pattern of log event information comprises one or more events that occur within a limited time period.

17. The system of claim 15, wherein in determining the first pattern of log event information, the instructions cause the system to:
detect the first pattern in the log event information;
determine a match count;
when the match count meets a count threshold, categorize the first pattern; and
based on the category, trigger an upload of detailed log information from the first network device.

18. The system of claim 15, wherein the match count includes a correlation of the first pattern to customer complaints and service calls information.

19. The system of claim 15, wherein the instructions further cause the system to:
use unsupervised machine learning techniques to determine a second pattern of log event information correlated to a second anomaly of at least the first network device;
select a second mitigation process including the one or more mitigation actions programmed in the first network device; and
instruct the first network device to monitor its own log event information for the second pattern of log event information and, when the second pattern of log event information is detected, to implement the second mitigation process.

20. The system of claim 15, wherein the plurality of network devices comprises a plurality of network devices operating at a plurality of customer premises.

* * * * *